Jan. 1, 1957  F. J. ALTMAN  2,776,425
COHERENT RADAR SYSTEM
Filed Oct. 29, 1952  2 Sheets-Sheet 2

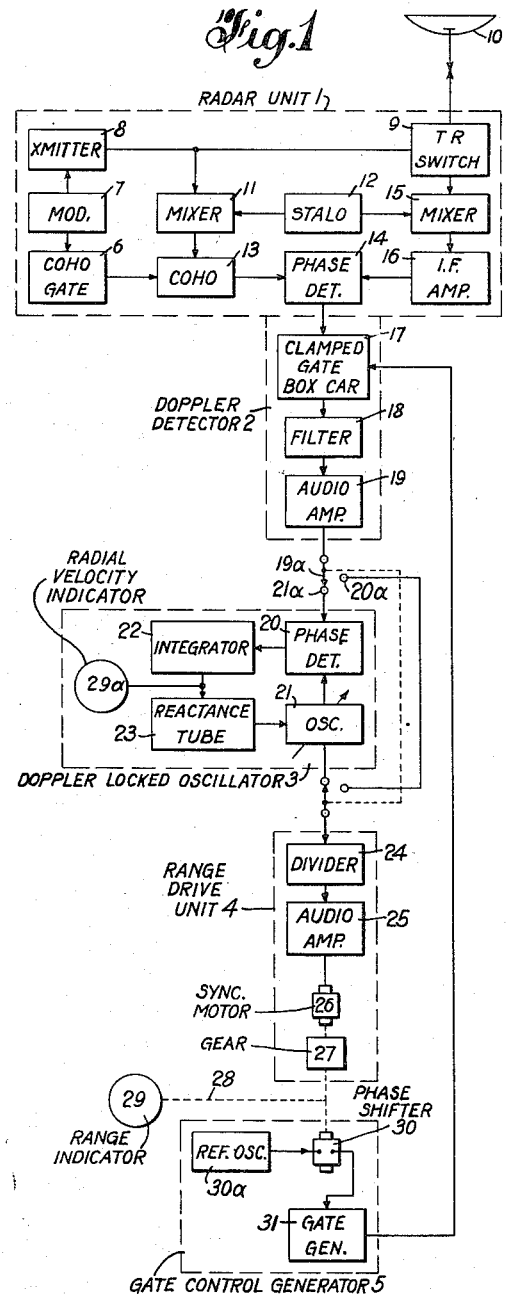

INVENTOR
FREDERICK J. ALTMAN
BY Ernest Fannick
ATTORNEY

2,776,425
Patented Jan. 1, 1957

2,776,425
COHERENT RADAR SYSTEM

Frederick J. Altman, Ridgewood, N. J., assignor to International Telephone and Telegraph Corporation, a corporation of Maryland Application October 29, 1952, Serial No. 317,557

19 Claims. (Cl. 343—7.7)

This invention relates to a coherent radar system and more particularly to a Doppler locked coherent radar system.

With an ordinary non-coherent radar system, it is usually difficult to distinguish the echo returned by a moving target from the echo returned by a fixed target. To overcome such difficulties, coherent radar systems have been developed which basically comprise a transmitter emitting a pulsed carrier wave signal whose echo is returned from the targets both fixed and moving and compared in a receiver with the original carrier wave oscillations. Coherence implies that a carrier wave voltage is supplied to the receiver which is in phase or coherent with the pulse transmission. The coherent radar system can definitely distinguish between moving and fixed targets by use of the Doppler effect. The distance that the transmitted energy pulses of a radar system must travel to and from a fixed target is always the same and the phase of the returned or echo signal is always the same relative to the original carrier wave. Thus, fixed targets may be considered to represent fixed video frequency echoes. A moving target, however, continuously changes the path length and phase of the transmitted energy relative to the received echo producing a varying frequency envelope in the echo pulses. This envelope wave is the Doppler frequency. The Doppler frequency is proportional to the moving target's radial velocity divided by the wavelength of the transmitted signal. Conventional coherent radar systems, heretofore used, have eliminated the fixed echoes by passing the video output through a cancellation device, usually a dynamic storage unit, such as a delay line or occasionally an electronic tube. Such cancellation devices are undesirable in precision radar equipment because of their limited stability, precision, and linearity characteristics.

One method of extracting information on a moving target from the returned video frequency signals is to place a gate on the target and utilize only the Doppler frequency content of the gate output ignoring D.-C. and very low frequency noise of clutter components. However, such a method is objectionable because propeller modulation sidebands fall in the desired frequency band, and a frequency band wide enough to include the required range of Doppler frequencies is much wider than necessary for any given target.

One of the objects of this invention, therefore, is to provide a precision coherent radar system which is capable of extracting moving target information without the use of cancellation equipment.

Another object of this invention is to provide a Doppler locked coherent radar system which will eliminate interference due to clutter.

A further object of this invention is to provide a Doppler locked coherent radar system capable of providing range and azimuth information adequate for guiding approach for landing of aircraft.

According to a feature of this invention, a conventional coherent radar system is utilized to obtain the coherent video signals which are coupled to a Doppler detector. The output of the Doppler detector is coupled to a Doppler locked oscillator which "tracks" the Doppler frequency and thereby eliminates noise components. The Doppler frequency output of the Doppler locked oscillator is coupled to a drive unit, the output of which is coupled to an indicator to show range of the moving target.

A further feature of this invention is the use of a transmitter to illuminate a landing airplane which returns a signal to two Doppler locked coherent detector systems to obtain both a change in range and azimuth bearing of a moving target approaching a point between said detector systems to be utilized to a great advantage in radar instrument landing systems.

The above-mentioned and other features and objects of this invention will become more apparent by reference to the following description taken in conjunction with the accompanying drawings, in which:

Fig. 1 is a schematic diagram in block form of one embodiment of a Doppler locked coherent radar system of this invention;

Figure 3:
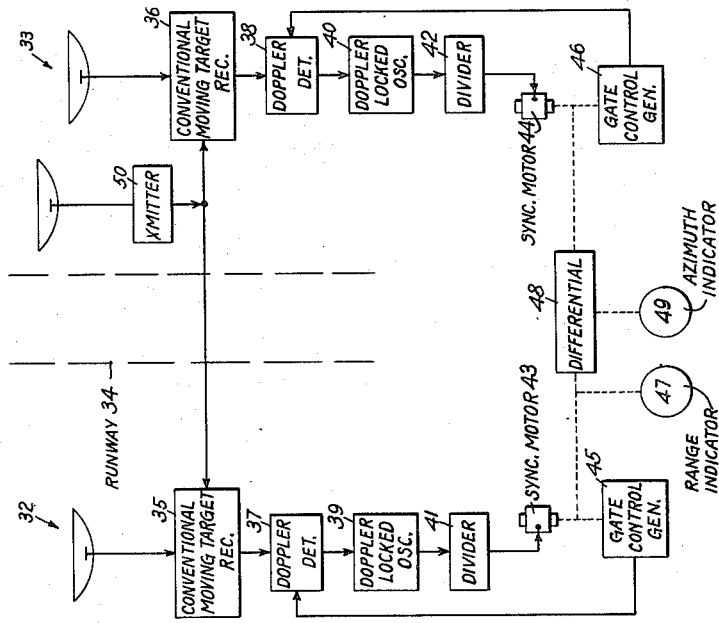
Fig. 3 is a schematic diagram in block form of an embodiment of this invention for use in a landing system for airplanes.

Referring to Fig. 1, a block diagram of a Doppler locked coherent radar system in accordance with the principles of this invention is shown wherein a conventional moving target or coherent radar receiver 1 detects the coherent video frequency signal which is coupled to a Doppler detector 2 whose output comprises the Doppler frequency plus noise components. The output of the Doppler detector 2 is coupled to a Doppler locked oscillator 3 which eliminates the noise components from the output of detector 2 and couples a pure Doppler frequency to a range drive unit 4 whose output is proportional to the range of a moving target and controls range unit 5 to provide automatic range tracking. The separate blocks illustrated are conventional in accordance with the legends applied thereto and therefore need not be shown in detail.

In order to obtain the coherent video frequency output of the conventional coherent radar receiver 1, it is necessary that the coherent oscillator gate 6 be in the off position shortly before modulator 7 fires transmitter 8. As modulator 7 fires transmitter 8, T-R switch 9 couples the transmitter output to radar antenna array 10. At the same time a portion of the transmitted signal is coupled to mixer circuit 11, along with a frequency from the stable local oscillator 12, where the transmitted signal is converted to an intermediate frequency and applied to a high Q tank circuit in the coherent oscillator 13. As the transmitter 8 couples energy to the antenna 10, coherent oscillator gate 6 is switched on causing the coherent oscillator 13 to oscillate with the initial phase of the transmitted signal, thus providing a coherent carrier wave reference voltage which is coupled to detector 14.

Figure 2:
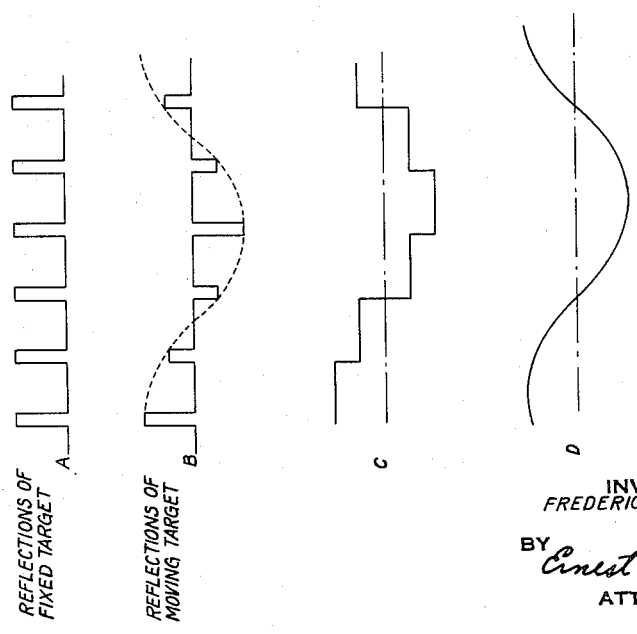
Fig. 2 is a series of curves helpful in the explanation of this invention.

The signal emitted by radar antenna 10 is reflected by both moving and fixed targets. As shown in Fig. 2, curve A, the signal reflected by a fixed target will be of constant amplitude whereas the signal reflected by a moving target will be of a varying amplitude as shown in Fig. 2, curve B. The envelope wave of the energy reflected by a moving target will vary at the Doppler frequency as is well known to those skilled in the art. When the transmitter ceases to provide energy, the T-R switch couples antenna 10 to mixer 15 where the received signal energy is mixed with the frequency from the stable local oscillator 12 and converted to an intermediate frequency which is coupled to an I.-F. amplifier 16 whose output is coupled to detector 14 along with the coherent carrier wave reference signal from oscillator 13. The input to phase detector 14 from I.-F. amplifier 16 when the echo received by antenna 10 is due to a fixed target will be in constant phase relation with the phase of the coherent reference signal from oscillator 13. However, when the echo is returned to the antenna by a moving target, there will be a varying phase difference between the two input signals to the balanced deteector 14.

The output of detector 14 is the video frequency signal input which may be assumed to contain several fixed and one moving target echo in addition to noise components. The output of detector 14 is coupled to the clamped gate or "boxcar" circuit 17 of Doppler detector 2. Circuit 17 samples the incoming coherent video signal from the coherent radar 1 during the gating period of the clamped gate pulse of circuit 17 and maintains the amplitude of the sampled value until the next gating period, as shown in Fig. 2, curve C. The output of circuit 17 is the Doppler frequency approximated by the envelope wave of the zero slope lines of the output of circuit 17. The output of circuit 17 is coupled to filter 18 which eliminates D.-C. components and all harmonics of the pulse repetition rate from the output of circuit 17, and the desired fundamental frequency of the envelope wave as shown in Fig. 2, curve D, is coupled to audio amplifier 19. The output of the Doppler detector 2 containing the Doppler frequency plus noise is coupled to the phase detector 20 of the Doppler locked oscillator circuit 3. The function of the Doppler locked coherent oscillator 3 is to lock onto moving target echoes in the presence of noise, shifting the moving target signals to D.-C. Of course, D.-C. will be obtained only when the target is moving at a constant radial velocity, and any acceleration or deceleration will be equivalent to a low frequency which would require an extension of the low pass range. This D.-C. control voltage will be obtained even in the presence of severe noise or clutter. To insure that the oscillator frequency of the Doppler locked coherent oscillator circuit 3 will be shifted to precisely the same frequency as the Doppler frequency due to the moving target, or more exactly that the phase of one follow the phase of the other, the D.-C. control voltage is utilized in a closed loop follow-up circiut. The phase detector 20 provides a voltage proportional to the phase error between the input Doppler frequency plus noise output of audio amplifier 19 and the output of oscillator 21. The phase detector 20 produces a zero output only when its inputs are exactly in a given reference phase. If the signal Doppler frequency output of amplifier 19 changes, the detector 20 produces a D.-C. voltage of the proper sign. This voltage is integrated in circiut 22 where it is modified by a function and applied to reactance tube 23 which controls the frequency output of oscillator 21 correcting the output to reduce any error. Integration circuit 22 besides providing a filtering action also provides a memory so if the input is momentarily absent, the oscillator 21 will not drop out of lock immediately. Thus the output of oscillator 21 follows the average Doppler frequency and maintains this frequency even though the target signal fades.

The output of oscillator 21 or the pure Doppler frequency is used to drive a range gate by a cycle counter method because each Doppler cycle represents a radial target motion of one-half the transmitted wavelength. If the output of amplifier 19 is a substantially pure Doppler frequency, switch 19a may be moved to contact 20a causing the pure Doppler frequency to be coupled directly to the range drive unit 4. However, when switch 19a makes contact with 21a, the Doppler frequency output of oscillator 21 is coupled to the divider 24 of range drive unit 4 which divides the Doppler frequency by a constant to make it suitable for driving an ordinary synchronous motor 26 after it is amplified in circiut 25. The output of the gear box 27 which is driven by motor 26 is coupled through linkage 28 to indicator 29. The output coupled to indicator 29 will be proportional to the range of the moving target. The output of gear box 27 is also coupled to phase shifter 30 which varies the phase of the signal from reference oscillator 30a. The relationship of the frequency of the output oscillator 30a to the frequency of the transmitted signal is such that it equals the frequency of the transmitted signal divided by the ratio of divider circuit 24 and the ratio of gear box 27 and one-half the number of poles of the synchronous motor 26. The output of the phase shifter 30 drives gate generator 31 of the range unit circuit 5, whose output is fed to the clamped gate boxcar circuit 17 of the Doppler detector 2 to control the gate delay. It is also obvious that the control voltage of reactance tube 23 whose output is the control voltage for oscillator 21 may be coupled to a meter 29a which will give an indication proportional to the radial velocity of the moving target since the radial velocity determines the Doppler frequency.

Referring to Fig. 3, a Doppler locked coherent radar system for use in obtaining the relative range and azimuth of a landing plane in accordance with the principles of this invention is shown wherein dual coherent radar receivers 32 and 33, each similar to the receiver portion of Fig. 1, are located on opposite sides of a landing strip or runway 34. Precise guidance to the touchdown point on runway 34 is insured by indicating cumulative departures from the given original azimuth to a fraction of a degree. The dual receivers 32 and 33 detect the echo outputs from conventional moving target radar units 35 and 36 and feed the coherent video signals to Doppler detectors 37 and 38. The detected Doppler frequency is coupled to Doppler locked oscillators 39 and 40 whose outputs are fed to dividers 41 and 42. The outputs of the dividers 41 and 42 drive synchronous motors 43 and 44 which are coupled to range units 45 and 46 providing a gating signal to detectors 37 and 38. The range of the moving target is shown on indicator 47. Each of the units 32 and 33 functions in a manner similar to the system of Fig. 1, and no further explanation is believed necessary other than to point out that one transmitter 50 and a common source for the stable locked oscillators (12 in Fig. 1) are utilized in common by both receivers 32 and 33, and it is not necessary to use two range units 45 and 46 since one range unit may couple gating signals to both detectors 37 and 38. A differential 48 obtains an indication proportional to azimuth deviation which is displayed on indicator 49.

The ranges to the moving target derived from the signals received on either side of the runway 34 by receivers 32 and 33 are compared in differential 48, and the range difference proportional to the relative cumulative gain or loss of Doppler frequency cycles is shown by indicator 49. One cycle corresponds to about one-seventh of a degree deviation when an antenna separation of approximately 320 feet is used, and the transmitted frequency is 1132 mc. As long as a landing plane heads for a center point between the two receivers 32 and 33, the two Doppler frequencies will be equal and the indication of the output of the differential 48 will remain stationary. However, any deviation from the original course of the plane is indicated by an appropriate output from the differential 48 displayed on indicator 49.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a radio system having a transmitter for radiating oscillatory energy toward a mobile reflecting object, a receiver for receiving waves reflected by said object, means for detecting the difference in phase between said transmitted energy and said reflected energy and means responsive to said phase detecting means to obtain the difference in frequency between said transmitted energy and said reflected energy; means to obtain a control voltage responsive to the detected difference in frequency, a variable oscillator and means responsive to said control voltage to lock said oscillator to said detected difference.

2. A system according to claim 1, which further includes indicator means responsive to said control voltage to indicate radial velocity of said mobile objects relative to said system.

3. A system according to claim 1, which further includes means responsive to the output of said variable oscillator means to generate a gating pulse, means to apply said gating pulse to said means for obtaining the difference in frequency between said transmitted energy and said reflected energy, and means responsive to said variable oscillator to measure the range of said object.

4. In a radio system having a transmitter for radiating pulse modulated oscillatory energy toward a mobile reflecting object, a receiver for receiving waves reflected by said object and means for detecting the difference in phase between said transmitted energy and said reflected energy; gating means to sample the output of said phase detector, means to detect the envelope wave of the output of said gating means, a variable oscillator, means to obtain a control voltage responsive to the difference in phase between the output of said variable oscillator and said envelope wave, means to control the frequency of said variable oscillator responsive to said control voltage to cause said variable oscillator to oscillate at the frequency of said envelope wave, and means responsive to the output of said variable oscillator to control the gate delay of said gating means.

5. A system according to claim 4, which further includes a synchronous motor responsive to the output of said variable oscillator means and indicator means responsive to the output of said motor whereby an indication of a distance of said reflecting object is obtained.

6. A system according to claim 5, which further includes means to divide the frequency output of said variable oscillator means, means to amplify said divided output and means to couple the output of said amplifier means to said motor.

7. A system according to claim 6, wherein said means to control the gate delay of said gating means includes oscillator means, phase shifting means to shift the phase of the output of said oscillator means responsive to the output of said motor and means to generate a pulse responsive to the output of said phase shifting means.

8. A system according to claim 4, wherein said means to detect the envelope wave of the output of said gating means includes frequency filter means and means to amplify the frequency output of said filter means.

9. A system according to claim 4, wherein said means to obtain a control voltage includes means to detect a difference in phase between the outputs of said envelope wave detecting means and said variable oscillator and means to modifying the output of said phase detector means.

10. A system according to claim 4, wherein said means to control the frequency of said variable oscillator responsive to said control voltage includes a reactance tube in said variable oscillator means and means to couple said control voltage to said reactance tube.

11. In a radio system, a transmitter for radiating oscillatory energy toward a mobile reflecting object moving on a predetermined course, means to detect deviations of said object from said course comprising a first receiver located to one side of said course, a second receiver located on the other side of said course, each of said first and second receivers being synchronized to the transmission of said transmitter to detect the Doppler frequency between said transmitted and reflected energy, means to obtain the difference in Doppler frequencies detected by each of said receivers and indicator means responsive to said difference in Doppler frequencies.

12. In a radio system, a transmitter for radiating oscillatory energy toward a mobile reflected object moving on a predetermined course, means to detect deviations from said course comprising a first receiver located to one side of said course, a second receiver located on the other side of said course, each of said first and second receivers being synchronized to the transmission of said transmitter to receive waves reflected by said object, means to detect the difference in phase between said transmitted energy and the reflected energy received by each of said receivers, a second detector means responsive to said phase detector means to obtain the difference in frequency between said transmitted energy and the energy received by each of said receivers, and means to indicate the difference in the difference frequencies detected by the said second detector means of the two receivers.

13. A system according to claim 12, which further includes indicator means responsive to said difference frequency detected by one of said phase detector means.

14. A system according to claim 12, wherein each of said receivers further includes means responsive to the difference frequency between said transmitted energy and the energy received by such receiver to generate gating pulses, means for applying said gating pulses to said second detector means and means responsive to the gated output of said second detector means to measure the range of said object.

15. In a radio system, a transmitter for radiating oscillatory energy toward a reflecting object moving on a predetermined course, means to detect deviations from said course comprising a first receiver located to one side of said course, a second receiver located on the other side of said course, each of said first and second receivers being adapted to receive waves reflected by said object, means synchronized to operation of said transmitter for detecting the difference in phase between said transmitted energy and said reflected energy received by each receiver, gating means to sample the phase detector output of each receiver, means to detect the envelope wave of the output of each said gating means, a variable oscillator associated with each of said receivers, means to obtain control voltages responsive to the difference in frequency between the output of said variable oscillator and said envelope wave of each receiver, means to control the frequency of said variable oscillators responsive to the control voltages of each receiver to cause said variable oscillators to oscillate at the frequency of the respective envelope wave of each reeciver, and means responsive to the output of each of said variable oscillators to control the gate delay of said gating means of each of said receivers.

16. A system according to claim 15, which further includes means to obtain the difference in frequency between each of said variable oscillators.

17. A system according to claim 15, which further includes indicator means responsive to the output of one of said variable oscillators whereby an indication of the radial velocity of said mobile object relative to said system is obtained.

18. A system according to claim 15, which further includes a synchronous motor responsive to the output of said variable oscillator means and indicator means responsive to the output of said motor to measure the range of said mobile object.

19. A system according to claim 18, wherein said means to generate a gating pulse includes a pulse generator responsive to the output of said synchronous motor.

References Cited in the file of this patent

UNITED STATES PATENTS

| 2,540,076 | Dicke | Feb. 6, 1951 |
| 2,611,892 | Casabona et al. | Sept. 23, 1952 |
| 2,617,983 | Emslie | Nov. 11, 1952 |
| 2,688,743 | Berger et al. | Sept. 7, 1954 |
| 2,717,377 | Tasker et al. | Sept. 6, 1955 |